(12) United States Patent
Ellis

(10) Patent No.: US 6,381,056 B1
(45) Date of Patent: *Apr. 30, 2002

(54) DARK PULSE GENERATION AND TRANSMISSION

(75) Inventor: Andrew D Ellis, Suffolk (GB)

(73) Assignee: British Telecommunications public limited company, London (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/913,708
(22) PCT Filed: Apr. 1, 1996
(86) PCT No.: PCT/GB96/00796
§ 371 Date: Sep. 22, 1997
§ 102(e) Date: Sep. 22, 1997
(87) PCT Pub. No.: WO96/31029
PCT Pub. Date: Oct. 3, 1996

(30) Foreign Application Priority Data

Mar. 31, 1995 (EP) .............................................. 95302201

(51) Int. Cl.[7] .......................... H04B 10/04; H04J 14/08
(52) U.S. Cl. ...................................... 359/181; 359/135
(58) Field of Search ................................ 359/135, 137, 359/138, 180, 181, 188

(56) References Cited

U.S. PATENT DOCUMENTS

| 5,073,980 A | 12/1991 | Prucnal et al. ............... 359/140 |
|---|---|---|
| 5,434,693 A * | 7/1995 | Tanaka et al. ............... 359/180 |
| 5,477,375 A * | 12/1995 | Korotky et al. ............. 359/183 |
| 5,530,585 A | 6/1996 | Reid et al. ................... 359/344 |
| 5,625,479 A | 4/1997 | Suzuki et al. ............... 359/135 |
| 5,737,110 A | 4/1998 | Suzuki et al. ............... 359/161 |
| 5,751,455 A * | 5/1998 | Shibutani et al. ........... 359/126 |
| 5,784,185 A | 7/1998 | Smith et al. ................ 359/136 |
| 5,786,918 A * | 7/1998 | Suzuki et al. ............... 359/135 |
| 5,892,608 A | 4/1999 | Suzuki et al. ............... 359/189 |

FOREIGN PATENT DOCUMENTS

| CA | 2093986 | 10/1993 |
|---|---|---|
| EP | 0 266 870 | 5/1988 |
| EP | 0 556 974 | 8/1993 |
| EP | 0 573 752 | 12/1993 |
| FR | 2 715 524 | 7/1995 |
| WO | WO 92/07430 | 4/1992 |
| WO | WO 96/31029 | 10/1996 |
| WO | WO 97/31436 | 8/1997 |

OTHER PUBLICATIONS

Ellis, A. D. et al., "Transmission of a True Single Polarisation . . . ", Electronics Letters, vol. 29, No. 11, May 27, 1993, pp. 990–992.

Ellis, A. D. et al., "Three–Node 40 Gbit/s OTDM Network . . . ", Electronics Letters, vol. 30, No. 16, Aug. 4, 1994, pp. 1333–1334.

(List continued on next page.)

Primary Examiner—Leslie Pascal
(74) Attorney, Agent, or Firm—Nixon & Vanderhye P.C.

(57) ABSTRACT

A number of optically cascaded electroabsorption modulators (EAM) are electrically biased to provide an optical time division multiplexed (OTDM) signal. The optical input into the first of the cascaded EAMs is a substantially cw light beam In operation, each EAM is normally biased to allow transmission of light, and data is represented by blocking transmission of light for a short period, thereby imposing dark pulses onto the light. Thus, light between dark pulses remains unperturbed and is available for further modulation by subsequent EAMs. In this way, each EAM can be arranged to rpovide a single data channel of the overall OTDM signal.

26 Claims, 3 Drawing Sheets

OTHER PUBLICATIONS

Ellis, A. D. et al., "Compact 40 Gbit/s Optical Demultiplexer . . . ", Electronics Letters, vol. 29, No. 24, Nov. 25, 1993, pp. 2115–2116.

Kawanishi, S. et al., "All–Optical Time Division . . . ", Electronics Letters, vol. 30, No. 20, Sep. 29, 1994, pp. 1697–1698.

Patrick, D. M. et al., "Bit–Rate Flexible All–Optical . . . ", GCOC 1993, 3 pgs.

Optics Letters, Apr. 1, 1992, USA, vol. 17, No. 7, ISSN 0146–9592, pp. 493–495, XP000262593 Swartzlander G A Jr: "Dark–soliton prototype devices: analysis by using direct–scattering theory" see abstract.

IEICE Transactions on Electronics, Jan. 1995, Japan, vol. E78–C, No. 1, ISSN 0916–8524, pp. 12–21, XP000495078 Suzuki M et al: long–distance soliton transmission up to 20 Gbit/s using alternating–amplitude solitons and optical TDM: see abstract see p. 14, left–hand column, paragraph 3—right–hand column, paragraph 4 see figures 2, 10.

Ellis, A. D. et al., "690 Node Global OTDM Network Demostration", Electronic Letters, Jul. 1995, vol. 31, No. 14, Figure 1, pp. 1171–1172.

Harper, P. et al., "Soliton Transmissionb Over 2700KM Using an In–Fiber Bragg Grating Filter to Give Gordon–Haus Jitter Reduction", IEEE 1996, pp. Aug. 1–Aug. 4.

Barry, L. et al., "A High Speed Optical Star Network Using TDMA and All–Optical Demultipling Techniques", IEEE Journal on Selected Area in Communications, vol. 14, No. 5, Jun./1996, pp. 1030–1038.

Cai et al., "Demonstration of Photonic Packet–Switched Ring Network With Optically Transparent Nodes", IEEE Photonics Technology Letters, Sep. 1994, New York, US, vol. 6, No. 9, pp. 1139–1141.

Suzuki et al., "Dark Pulse Generation and Detection Using Bright–Dark Conversion", $21^{st}$ European Conference on Optical Communications (ECOC '95), 17–21 Sep. 1995, Brussels, BE, pp. 299–302.

Koai et al., "Nonregenerative Photonic Dual Bus With Optical Amplifiers", IEEE Photonics Technology Letters Apr. 1993, New York, US, No. 4, pp. 482–485.

* cited by examiner

DARK PULSE GENERATION AND TRANSMISSION

BACKGROUND OF THE INVENTION

1. Field of the Invention

The present invention relates to optical signals and to optical signal generation for use in optical communications, and finds particular application in optical time division multiplexing (OTDM).

2. Related Art

The use of OTDM signals currently offers both access to aggregate data capacities beyond the reach of commercial broadband electronics, and the additional flexibility of optical routing without recourse to high capacity electronic switches.

Typically, short pulses may be encoded and interleaved to produce a traditional OTDM data sequence, or modulators may be used to shape pulses and form an optically multiplexed signal by combining several such sequences. Both of these optical techniques require multiple optical paths and accurate synchronisation of the optical path lengths. It is also important in an OTDM interleaver in these known arrangements to exhibit a high enough extinction ratio to avoid interference effects at its output between data channels. Furthermore, the maximum line rate (eg 100 GHz) of an OTDM system is determined to a large extent by the width of the base rate leg 10 GHz) pulses, as highlighted in "Transmission of a true single polarisation 40 Gbitis soliton data signal.", Electronics Letters, vol. 29, no. 11, pp990–992.

One alternative method of producing an OTDM signal is described in "All-optical time division multiplexing using four-wave mixing", Electronics Letters, vol. 30, no. 20, pp 1697–1698. In this paper OTDM is achieved by modifying a 100 GHz 1547 nm optical signal by time-delayed 6.3 Gbit/s signals to generate sub-channels in a 1557 nm 100 Gbit/s signal via four-wave mixing. This method requires a series of wavelength division multiplexers each adding a sub-channel, or data channel, to an OTDM stream. Whilst this method relaxes the constraints on the extinction ratio of the 100 GHz signal, precise control of optical delays is still required.

This and other methods known to the applicants deal only with what may be termed "bright pulse" OTDM transmission.

SUMMARY OF THE INVENTION

The present inventors have realised that it is both possible and advantageous to implement optical communications systems in which "dark pulses" replace "bright pulses" as the information-bearing component.

According to one aspect, the present invention provides a method of generating an optical data signal, wherein dark pulses representative of one or more data sequences are imposed by at least two dark pulse generators onto an optical input signal received by said generators for subsequent transmission along an optical fibre, the dark pulse generators being in optically coupled alignment with the optical input.

The optical input may comprise a substantially continuous burst of optical radiation, such as might be provided by the output of a continuous wave optical signal generator. Alternatively, the optical input may comprise a pulse train such as might be provided by an optical clock. The effect on an incoming pulse train such as that provided by an optical clock might then be that bright pulses are missing from the pulse train.

In this specification, a "dark pulse" is a temporal gap, or region of reduced intensity radiation, in incoming optical radiation, or light beam. (Although generally in optical communications, the emphasis lies on speed and therefore short pulse lengths are advantageous, the term "dark pulse" should not be taken to indicate of itself a limitation on the length of the temporal gap, or region of reduced intensity radiation.)

An advantage of using dark pulses in place of bright pulses is that optical signal generation may be simplified, as will be discussed in the subsequent description.

Each of the dark pulse generators may provide a respective data signal and these may be interleaved so as together to provide an OTDM signal. A particularly convenient way of providing the interleaving is to fabricate the dark pulse generators on a common substrate, optically aligned so that the output of one, carrying its dark pulse data train, is fed straight to the next which can then add its own in a different time slot of the OTDM signal. As is further discussed below, this avoids the use of optical delay lines although it is still necessary to provide electrical synchronisation between the dark pulse generators.

(It should be noted that embodiments of the invention are not limited to OTDM however as there may clearly be other applications which benefit from the present invention. It would be possible for instance to produce a single output signal by means of consecutive dark pulses being generated by consecutive dark pulse generators. Such an arrangement may still benefit from a speed advantage.) Use of dark pulses in OTDM is particularly advantageous. While pulse alignment remains important for dark pulse OTDM, the extinction ratio is less of a problem than in bright pulse OTDM. This is because, in bright pulse OTDM, there have to be provided multiple parallel optical paths so that each pulse generator can add its pulses without "blotting out" pulses imposed by another pulse generator. These multiple optical paths have to be recombined and that causes interference problems because of phase variations in the background. The random interference causes errors unless there is an extinction ratio of about for instance 40 dB in a four channel system. In dark pulse OTDM however, there is only the one optical path, therefore there does not have to be recombination of the paths and the interference effects described simply do not happen. Although there is still a constraint on the extinction ratio in dark pulse OTDM, it is a question of the power budget at the receiver. A reasonable extinction ratio in a four channel system for dark pulse OTDM is more likely to be of the order of 15 dB.

In a preferred embodiment, each one of the dark pulse generators generates dark pulses for just one data channel of the OTDM signal. Electronics would thus only limit the data rate of a single data channel. The overall optical signal data rate could then be well beyond the aggregate data rate of commercial broadband electronics.

Preferably, a dark pulse generator comprises an optical modulator having both high and low optical transmission states and a high optical extinction ratio (although, as discussed above, not as high as that required for bright pulse OTDM). The operation in one or other state may for example be determined by an electrical bias signal. The optical extinction ratio, as discussed above, could for instance be signicantly less than 40 dB in a four data channel system, for instance lying in the range 10 to 30 dB, and a reasonable value being of the order of 15 dB.

The applicants have shown that a suitable optical modulator is an electro-absorption modulator (EAM). A suitable electrical bias signal for an EAM comprises clock (for example a sinewave) and data components combined, for example, using a simple power splitting arrangement, where a dark pulse is formed when both clock and data components are negative. This arrangement obviates the need for signal processing in the electrical domain which would otherwise be necessary to provide a suitable data-encoded bias signal.

Preferably, an EAM is biased to provide high optical extinction for a short period of time to encode a dark pulse onto a light beam input. When no data is present, the electrical signal is arranged to bias the EAM to be in its high optical transmission state.

In a preferred embodiment of the present invention, a plurality of EAMs are optically cascaded and are arranged to generate dark pulses on a light beam from a single light source.

Preferably, each EAM is arranged to generate one OTDM channel. This arrangement has the advantage that each EAM leaves light substantially unperturbed between the dark pulses which it generates, and each subsequent modulator in the cascade can then modulate the unperturbed light. Thus, with suitable electrical timing it is possible to generate a high-speed OTDM data signal.

In theory, any number of EAMs may be cascaded to provide any number of data channels of an OTDM signal from a single light source. In contrast, other known methods, using multiple EAMs and bright pulses, would require either multiple light sources or one light source with multiple outputs to provide a comparable OTDM signal.

In practice, the number of EAMs which could be cascaded in accordance with the present invention would be limited by the shortest pulse width available from each modulator. For example, if the shortest dark pulse that can be generated is 10 ps, then only ten modulators can be placed in a row (at 10 Gbit/s) to produce 100 Gbit/s data. However, if dark pulses having widths less than 5 ps can be generated, then twice as many modulators may be cascaded.

A further limitation on the number of modulators which may be cascaded is due to optical loss incurred by each EAM, since an EAM does in fact incur some loss even when in its high optical transmission state. However, such loss could be compensated for by including optical amplification between one or more of the EAMs. For example, one or more optical fibre amplifiers, such as rare-earth doped fibre amplifiers using erbium or praseodymium could be used to provide amplification between EAMs.

Advantageously, the use of optically cascaded EAMs allows time slot alignment to be carried out substantially only in the electrical domain, when using the EAMs to generate dark pulses. Thus, optical delay lines can generally be dispensed with to provide time slot alignment.

In a particularly advantageous form of the invention, a plurality of EAMs are integrated by forming the EAMs, in cascaded optical alignment, on a single semiconductor (for example InP) substrate. Preferably also, a single light source may be integrated onto the same substrate, in optical alignment with the cascaded modulators, to provide a single OTDM signal generating device. Advantageously, the whole optical system for an OTDM signal generator could thus be provided as a single semiconductor device. Such a device could be relatively cheap and compact compared to known devices or systems. In any of these "integrated" arrangements, it would of course be possible to use semi-conductor optical amplifiers between adjacent ones of the EAMs.

An alternative dark-pulse generator to an EAM could be an optical AND gate, for example an AND gate implemented using a non-linear optical loop mirror (NOLM), operating with a switching window (provided by an optical switching signal) which switches light transmission from a main transmission path to an alternate path for the period of one pulse width. However, a NOLM typically requires a long length of optical fibre incorporating some non-linearity, such as a non-linear semiconductor device or a doped optical fibre, to provide switching by known phase modulation effects. Such an arrangement would not be so convenient or robust as the EAM arrangement described above. Also, the switching window for a NOLM would need to be provided by an optical signal and could not be generated directly by an electrical signal. Thus, such a system would need two optical stages at least for pulse generation (optical pulse formation stage and optical window stage), mitigating the advantages of using dark pulses generated by, for example, EAMs.

In accordance with a second aspect, the present invention provides an optical modulator for use in OTDM, the modulator comprising at least two optically cascaded dark pulse generators, for generating dark pulses representative of one or more data sequences on an optical input signal coupled from a light source to a first of said generators.

The optical input signal may for instance comprise a substantially continuous optical beam, or an optical clock comprising a series of bright pulses.

In accordance with a third aspect, the present invention provides an optical signal generator comprising:
  a light source;
  a plurality of means for generating dark pulses representative of one or more data sequences onto an optical input signal provided by the light source, said means being in optically coupled alignment, a first of said means being arranged to receive light from the light source; and
  means for coupling light from a last of said means into an optical fibre communication system Again, the optical input signal may for instance be substantially continuous or may be a clock pulse train, comprising a regular series of bright pulses.

In accordance with a fourth aspect, the present invention provides a semiconductor device comprising:
  a semiconductor substrate onto which are fabricated at least two electro-absorption modulators in optically coupled alignment, and
  means for providing electrical drive to each modulator, wherein each electro-absorption modulator and its electrical drive can be arranged, in use, to generate dark pulses representative of one or more data sequences onto a light beam input to a first of said modulators.

It may be convenient if a source for the light beam is also fabricated on the semiconductor substrate, in optically coupled alignment with the modulators.

In accordance with a fifth aspect, the present invention provides an optical signal comprising a dark pulse data train, wherein the signal is segmented into time slots to provide an optically time division multiplexed (OTDM) data sequence.

In accordance with a sixth aspect, the present invention provides an optical communications network including at least one signal generating arrangement according to any of the earlier aspects of the invention.

Whilst the use of embodiments of the invention with either a substantially continuous incoming light beam, or with some other input such as a bright pulse input, is discussed above, it will be realised that there may be a requirement for correct timing between a non-continuous input and the dark pulses to be imposed. For instance, there would clearly have to be synchronisation between an incoming clock signal and the dark pulses if the dark pulses are to remove selected bright pulses from the clock signal. This can be provided for instance by the electrical bias signal(s) in the case of EAMs.

In accordance with a further aspect of the present invention, there is provided an optical modulator comprising:

an optical clock source;

a plurality of means for selectively switching off light received from the clock source in order to generate dark pulses representative of one or more data sequences, said means being in optically coupled alignment, and a first of said means being arranged to receive light from the clock source; and means for coupling light from a last of said means into an optical fibre communication system.

In accordance with a still further aspect of the present invention, there is provided an optical modulator comprising:

i) an electro-absorption modulator having high and low optical transmission states;

ii) an electrical bias input to the electro-absorption modulator; and iii) an electrical data input to the electro-absorption modulator;

wherein the data input combines with the bias input to change the state of the electro-absorption modulator at least temporarily to a low transmission state, the change in transmission state generating a dark pulse representative of one or more data sequences.

BRIEF DESCRIPTION OF THE DRAWINGS

Embodiments of the invention will now be described in detail, by way of example only, with reference to the accompanying figures in which.

DETAILED DESCRIPTION OF EXEMPLARY EMBODIMENTS

A convenient system for generating dark pulses will now be described. For ease of explanation only, initially the description covers the case of a system incorporating only one EAM. In practice, more than one EAM would be utilised, as described in more detail below.

Figure 1:
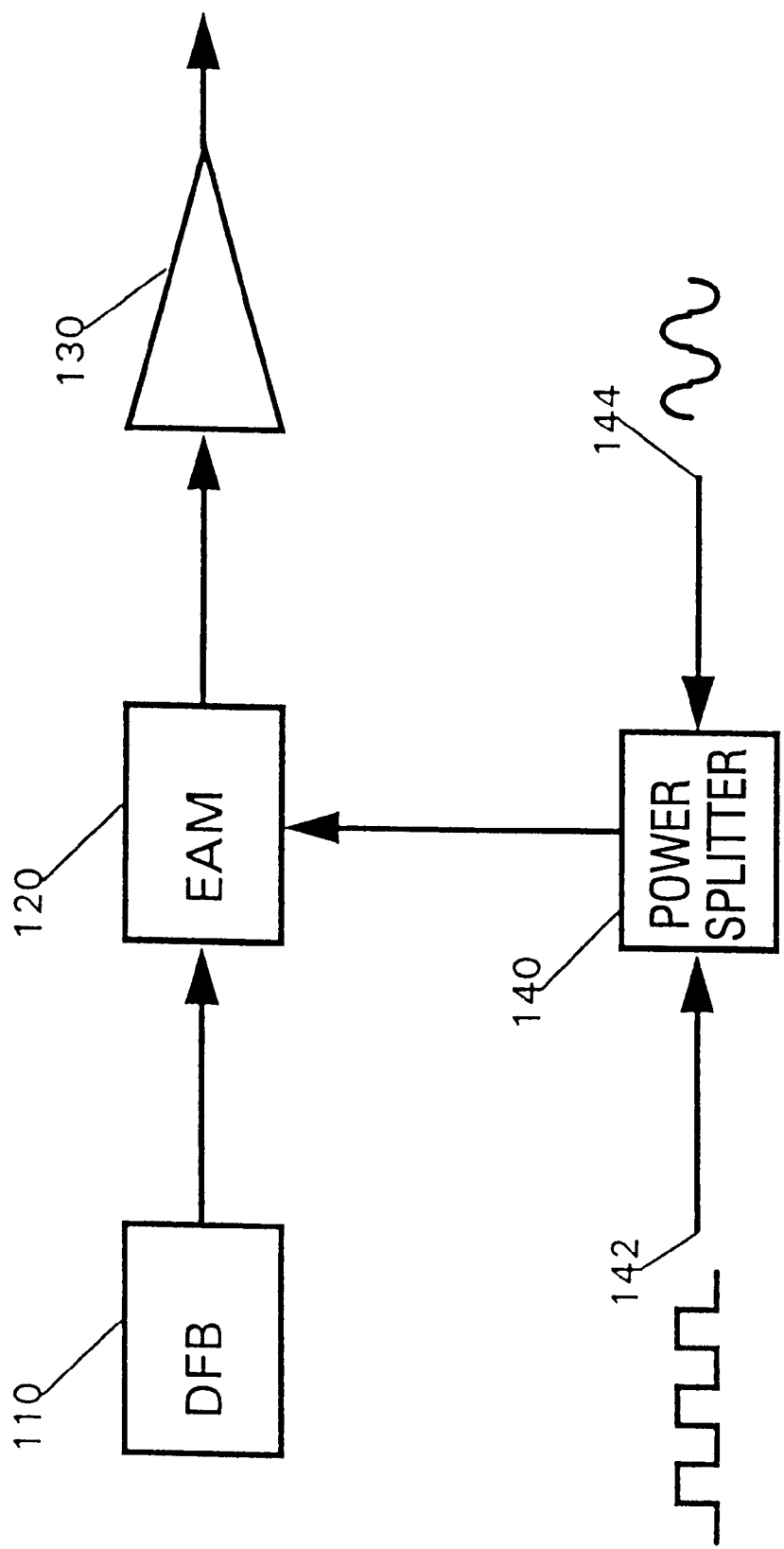
FIG. 1 illustrates a system according to the present invention incorporating one EAM.

In FIG. 1, a 1555 nm DFB laser source 110 is coupled into an EAM 120 with a power level of −2 dBm. The EAM has a maximum extinction ratio of 20 dB and a mean absorption characteristic of 2.5 dB/V. A 10 GHz sinewave drive 142 is synchronised with and passively added to a 10 Gbit/s data sequence from a data source 144 via a power splitter 140 (used in reverse to combine the two signals). A suitable power splitter is the Wiltron K24OB, available from Anritsu Wiltron. Both the sinewave and data sequence signal levels have a 2.5V peak-to-peak amplitude. The resulting signal comprises a sinewave with an offset voltage determined by the data signal, with the relative amplitudes arranged such that the maximum value of the cycle for a data 0 is below the minimum level for a data 1. It will be appreciated that the use of this precise arrangement is not essential, and it would be sufficient to ensure that the entire 10 GHz cycle remains in the low absorption region of the modulator for a data 1. The electrical signal is applied to the EAM 120, and the DC bias is adjusted to ensure that the entire cycle for a data 1 gives low extinction, whilst the troughs of the cycle for a data 0 give a high extinction. Consequently, dark-pulses are formed for data 0's, whilst a low extinction is maintained for data 1's.

Figure 2:
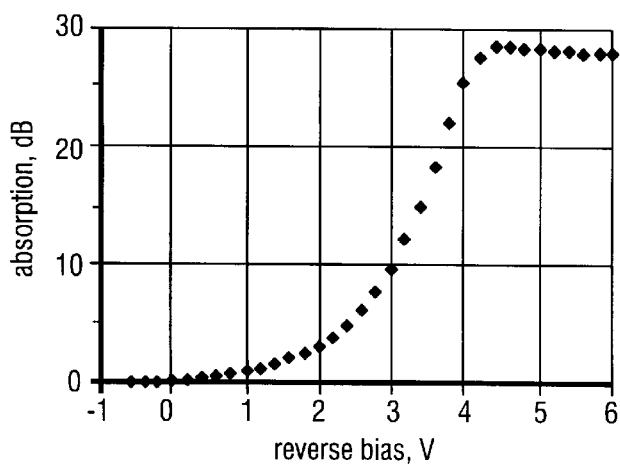
FIG. 2 is a graph representing a typical operational characteristic of an EAM.

An EAM suitable for use in the system is the one described in, for example, "Generation of 6.3 ps optical pulses at a 10 GHz repetition rate using a packaged EAM and dispersion compensating fibre", Electronics Letters, Volume 30, pp 1700–1701, which is incorporated herein by reference. The absorption characteristic of this EAM is reproduced in FIG. 2. In FIG. 2, it can be seen that the EAM has an operating region of low extinction at positive or low negative reverse biases, an operating region of high extinction at high reverse biases, and an exponentially varying operating region in between. It is the exponentially varying operating region of the EAM which supports the generation of soliton-like dark pulses.

Figure 3:
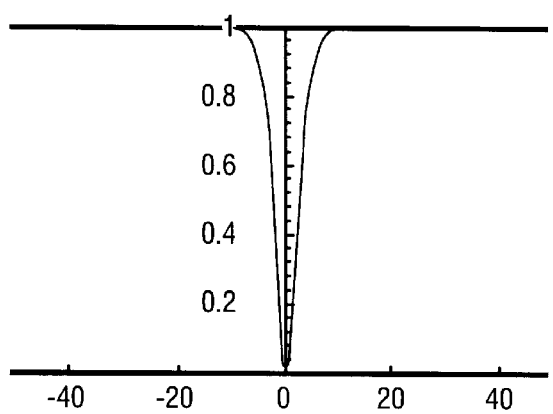
FIG. 3 is a representation of an optical output signal provided by the system in FIG. 1.
Figure 5:
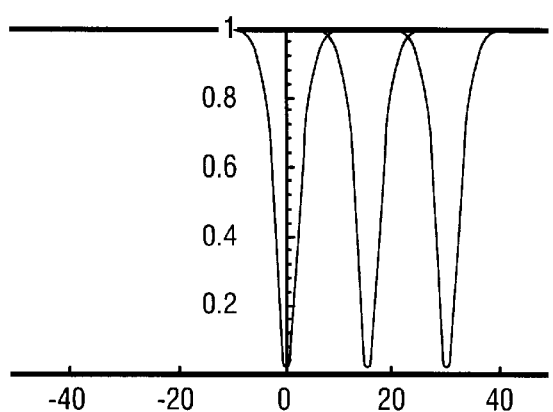
FIG. 5 is an eye diagram of an optical output signal provided by the system in FIG. 4.

In theory, the dark pulses generated should resemble inverted $SECH^2$ pulses (that is to say, inverted solitons) having the form:

$$P(t) = (\text{Peak Power}) \times (1 - SECH(1.76(t/\tau))^2) \quad \text{(equation 1)}$$

where $\tau$ represents the pulse width at half its peak power. In operation, the EAM is electrically biased to remain in its low loss condition unless both data and sinewave are negative. That is to say, the EAM transmits light unless both electrical signal components are negative. Thus, dark pulses are generated corresponding to data zeros, as illustrated in FIG. 3, which closely resemble the theoretical form of equation 1.

Figure 4:
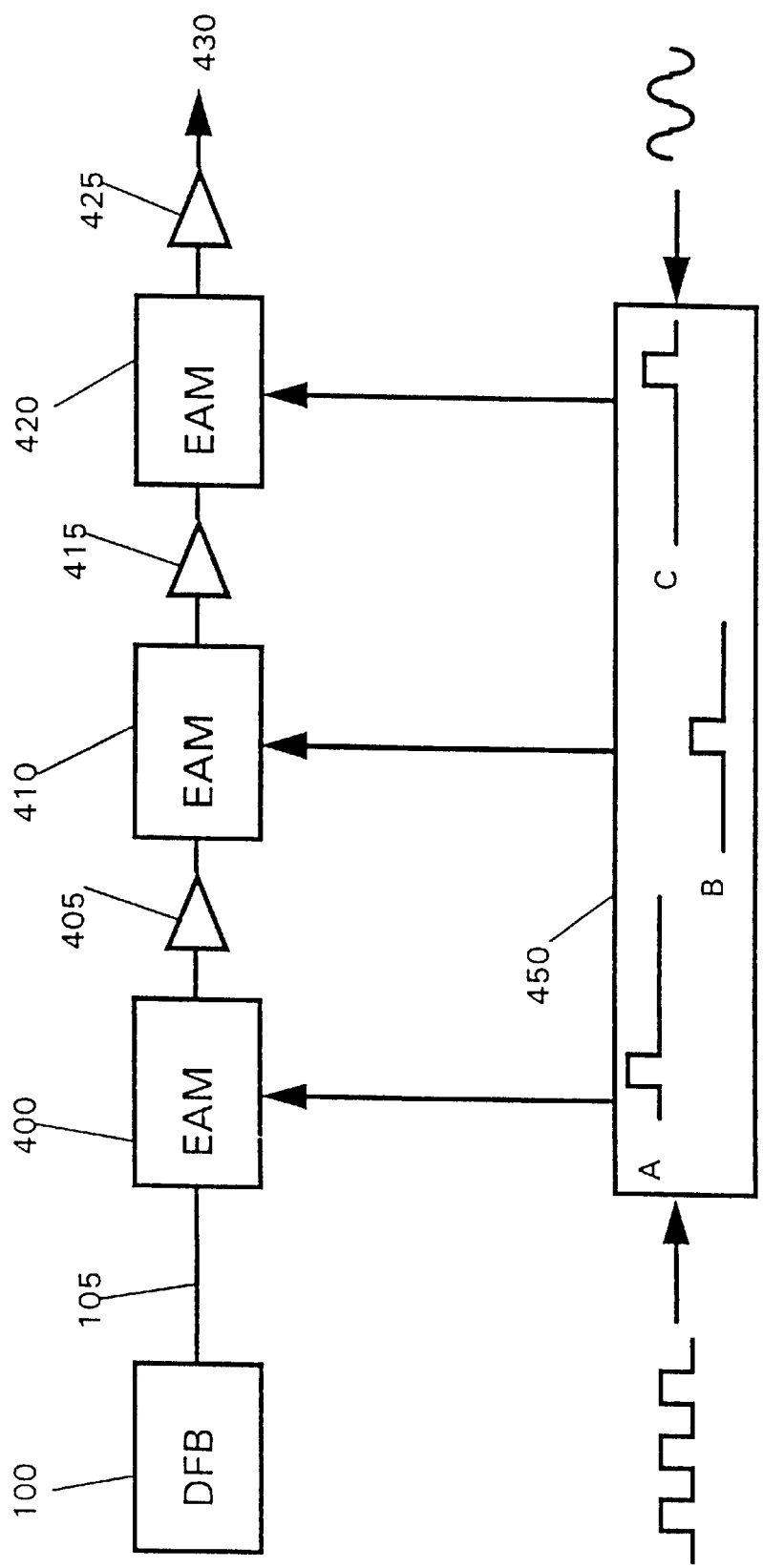
FIG. 4 illustrates a system incorporating three EAMs.

FIG. 4 shows a system according to the present invention implementing three EAMs. In the system, three EAMs 400, 410 and 420 are optically cascaded, or are arranged to be in optically coupled alignment, with an optical light source 100, comprising a 1555 nm DFB laser. Conveniently, the laser light is coupled onto the first EAM 400, using a standard telecommunications optical fibre 105, the light having a power level of −2 dBm. In this example, optical amplifiers 405, 415 and 425, for example EDFAs, follow each EAM to compensate for any losses incurred in the EAMs. The amplifiers are generally only incorporated if necessary to compensate for optical loss incurred by the EAMs. As for the system illustrated in FIG. 1, each EAM is driven by an electrical signal comprising a sinewave component and a data component aligned in data channel slots A, B or C. Since three electrical drive signals are required, electrical timing circuitry 450 is required to ensure that the data signals A, B and C are aligned correctly with the sinewave and are aligned also in the correct slot positions of the required OTDM signal which is output downstream of the third amplifier 425.

The light source can be separate from the modulator, the light from the light source being coupled into the modulator via, for example, an optical fibre as described above. However, in an alternative arrangement the light source and the EAMs are fabricated as an integrated device on a common semiconductor substrate. Apart from convenience, this arrangement has the advantage that coupling loss between each modulator and between the light source and the first modulator is reduced. Also, amplification, if necessary, could be provided by integrating SLAs (semiconductor laser amplifiers) between one or more EAMs.

The skilled person will appreciate that any form of optical, acousto-optic or electro-optic modulator having the necessary transmission and extinction or switching properties to provide dark pulses would be suitable for implementing the present invention.

The electrical bias scheme described above for driving the EAM is particularly advantageous for two reasons. Firstly, only one electrical signal is required to bias each EAM and secondly the electrical signal does not require any electrical processing. Electrical processing would be required if using the method described in "Generation of 2.5 Gbit/s soliton data stream with an integrated laser modulator transmitter", Electronics Letters, Volume 30, pp 1880–1881.

EAMs suffer some optical loss even when operating in their low optical loss regions. The amount of optical loss of an EAM is partly determined by the length of the optical modulator section through which light from a light source travels. Thus, in known modulator schemes comprising two modulators or multiple modulator sections, which firstly generate an optical pulse stream using an electrical sinewave drive signal, and secondly modulate data onto the pulse stream using an electrical data signal, both modulators, or both modulator sections, incur an optical insertion loss. In that the proposed system only implements one modulator (section) per data channel, the system intrinsically incurs a lower insertion loss overhead, regardless of the type of modulator used, than other schemes incorporating more than one modulator, or modulator section, to generate one data channel.

As described above, the optical radiation is in the form of a substantially continuous burst. Obviously the duration of the burst depends on the application. For the example of a trunk communications network, where traffic is likely to be present at most times, the optical source might remain on all the time.

Alternatively, for a less busy optical link, the source might be switched on only when transmission of data, or part thereof (for a packet switched network for example), is required. Therefore "substantially continuous" might be interpreted as continuous during data transmission.

In an alternative embodiment to that described above, the cw light input into the first EAM can be substituted for an optical clock, for example a sinewave or pulse stream. Then, with the same general system arrangement used for dark pulse generation, each EAM can be used to modulate one time slot of the optical clock. That is to say, each EAM is able either to transmit, or prevent transmission, of light depending on the data-encoding requirements of its designated data channel. For example, for a 100 Gbit/s optical clock pulse stream, ten EAMs may be cascaded to encode ten 10 Gbit/s channels. Also, one or more EAMs operating according to this arrangement may be used as data-insert devices for one or more channels in an OTDM system. The skilled person would easily be able to implement data modulation or an insert function by applying the theory disclosed by the present description.

It will be realised that there may be embodiments of the present invention wherein an EAM is not followed by another EAM, or by an amplifier, but by another device acting on an optical signal train. Such embodiments will still benefit from the manner in which the EAM allows the signal to pass onwards. It may be for instance that it is desired to add a signal to an incoming data train from elsewhere. Embodiments of the present invention in which only one EAM is provided will enable that to be done.

The skilled person will also appreciate that the level-shifted sinewave bias signal described above for generating dark pulses would be suitable for generating bright pulses when applied to a single electrical input EAM. The electrical signal would in this case need to be arranged to maintain the EAM in its high optical extinction state unless both data and sinewave components were positive. Such an arrangement would obviate the need for electrical signal processing to generate a suitable bias signal, and would thus be a simple and robust solution. Thus, this arrangement could be used for generation of solitons or a conventional OTDM signal.

What is claimed is:

1. A method of generating an optical data signal, wherein dark pulses representative of one or more data sequences are imposed by at least two dark pulse generators onto an optical input signal received by said generators for subsequent transmission along an optical fibre, the dark pulse generators being in optically coupled alignment with the optical input.

2. A method according to claim 1, wherein the optical input comprises a substantially continuous burst of optical radiation.

3. A method according to claim 1, wherein the optical input comprises a train of bright pulses.

4. A method according to claim 1, wherein each dark pulse generator generates dark pulses representative of a respective data channel of an OTDM signal.

5. A method according to claim 1, wherein each dark pulse generator comprises an optical modulator.

6. A method according to claim 5, wherein a dark pulse generator comprises an electro-absorption modulator.

7. An optical modulator comprising at least two optically cascaded dark pulse generators, for generating dark pulses representative of one or more data sequences on an optical input signal coupled from a light source to a first of said generators.

8. A modulator according to claim 7, wherein each of said dark pulse generators generates, in use, pulses representative of a respective data channel in a multi-channel data signal.

9. A modulator according to claim 8 wherein the multi-channel signal comprises an OTDM signal and each of said generators is assigned a respective time slot of the OTDM signal.

10. A modulator according to claim 7 wherein the dark pulse generators are each provided with electrical drive to provide said dark pulses, the electrical drives to respective generators providing control over pulse generation, including the relative timing thereof.

11. A modulator according to claim 7, wherein each of said generators comprises a single optical modulator.

12. A modulator according to claim 11, wherein each of said generators is an electro-absorption modulator.

13. A modulator according to claim 7, wherein the generators are fabricated on a common piece of semiconductor material.

14. A modulator according to claim 13, wherein the light input is provided by a light source which is fabricated on said common piece of semiconductor material in optical alignment with the first modulator.

15. An optical signal generator comprising:
a light source;
a plurality of means for generating dark pulses representative of one or more data sequences onto an optical input signal provided by the light source, said means being in optically coupled alignment, a first of said means being arranged to receive light from the light source; and means for coupling light from a last of said means into an optical fibre communication system.

16. An optical signal generator according to claim 15 wherein the light source provides a substantially continuous burst of optical radiation.

17. An optical signal generator according to claim 16 wherein the light source provides a stream of bright pulses, and the optical signal generator further comprises synchronisation means for synchronising generation of the dark pulses with bright pulses in the pulse stream.

18. An optical signal generator according to claim 15 wherein said means for generating dark pulses are each independently controllable to generate dark pulses onto the optical input signal in an allocated time slot of an OTDM signal.

19. A semiconductor device comprising:

a semiconductor substrate onto which are fabricated at least two electro-absorption modulators in optically coupled alignment, and means for providing electrical drive to each modulator, wherein each electro-absorption modulator and its electrical drive is arranged, in use, to generate dark pulses representative of one or more data sequences onto a light beam input to a first of said modulators.

20. A semiconductor device according to claim 19 which further comprises a light source fabricated on the substrate so as to provide a light input signal to said modulators.

21. A semiconductor device according to claim 19 wherein the means for providing electrical drive to each modulator is synchronised such that each modulator can provide dark pulses for an allocated time slot in an optically time division multiplexed (OTDM) signal.

22. An optical modulator comprising:

an optical clock source;

a plurality of means for selectively switching off light received from the clock source in order to generate dark pulses representative of one or more data sequences, said means being in Optically coupled alignment, and a first of said means being arranged to receive light from the clock source; and means for coupling light from a last of said means into an optical fibre communication system.

23. A method of generating an optical data signal, wherein dark optical pulses generated by causing an absence or interruption of a light signal otherwise continuously present during data transmission represent one or more data sequences and are imposed by at least two dark pulse generators onto an optical input signal received by said generators for subsequent transmission along an optical fibre, the dark pulse generators being in optically coupled alignment with the optical input.

24. A method as in claim 23 wherein the optical input comprises a substantially continuous burst of optical radiation.

25. A method as in claim 23 wherein the optical input comprises a substantially continuous train of bright light pulses.

26. A method as in claim 23 wherein each dark pulse generator generates dark pulses representative of a respective data channel of an OTDM signal.

* * * * *